ELECTRONIC FREQUENCY DISCRIMINATOR CIRCUIT

Filed Nov. 29, 1954

INVENTOR.
ROBERT C. MOORE
BY
Brown, Senk & Synnestvedt
AGENTS

ELECTRONIC FREQUENCY DISCRIMINATOR CIRCUIT

Filed Nov. 29, 1954

4 Sheets-Sheet 2

INVENTOR.
ROBERT C. MOORE
BY
Brown, Penk & Synnestvedt
AGENTS

March 4, 1958 R. C. MOORE 2,825,807

ELECTRONIC FREQUENCY DISCRIMINATOR CIRCUIT

Filed Nov. 29, 1954 4 Sheets-Sheet 3

INVENTOR.
ROBERT C. MOORE
BY
Brown, Denk & Synnestvedt
AGENTS

March 4, 1958 R. C. MOORE 2,825,807

ELECTRONIC FREQUENCY DISCRIMINATOR CIRCUIT

Filed Nov. 29, 1954 4 Sheets-Sheet 4

INVENTOR.
ROBERT C. MOORE
BY
Brown, Denk & Synnestvedt
AGENTS

United States Patent Office 2,825,807

Patented Mar. 4, 1958

2,825,807

ELECTRONIC FREQUENCY DISCRIMINATOR CIRCUIT

Robert C. Moore, Erdenheim, Pa., assignor to Philco Corporation, Philadelphia, Pa., a corporation of Pennsylvania Application November 29, 1954, Serial No. 471,567

13 Claims. (Cl. 250—27)

This invention relates generally to frequency variation detectors and more specifically to a frequency discriminator having the ability to detect frequency variation over an unusually wide bandwidth.

In the prior art there are many types of frequency discriminators having varying characteristics and adapted to function efficiently in many different applications. Usually, in frequency discriminators, steepness of slope of the characteristic curve is desirable. However, this ordinarily can be obtained only at the expense of decreasing the peak-to-peak bandwidth, which decreases the operable bandwidth. It is desirable in some applications, where the frequency might deviate beyond the upper or lower frequency peaks, to have a frequency discriminator that not only has a steep slope at crossover, but also has skirts or trailing edges that extend well beyond the upper and lower peak frequencies to encompass a much larger frequency bandwidth than do the prior art discriminators. One such application is in a type of color television receiver utilizing parallel phosphor stripes emissive of different colored light on the screen of a cathode ray tube, and wherein the scanning rate of the electron beam of the cathode ray tube in the direction transverse to the phosphor stripes must be kept constant within certain limits since the intensity of the beam at a given time determines the intensity of a given color.

The rate of scanning is determined by complex circuitry and is controlled by an indexing signal which is generated by the electron beam passing over a series of high secondary electron emission strips of material, positioned parallel to the phosphor stripes and at regular intervals on the screen of the cathode ray tube. When the receiver is initially energized, the scanning frequency may have sufficient deviation so that the index frequency is beyond the upper or lower frequency peaks of the frequency discriminator which monitors the index frequency. A frequency discriminator having a characteristic curve with skirts of a substantial value over a relatively wide frequency band able to detect such a deviation and also the direction of deviation would mark a definite improvement in the art.

An object of the invention is to provide a frequency discriminator having a characteristic curve that exhibits trailing edges of substantial value over wide frequency ranges on either side of the steep slope portion of the discriminator characteristic curve defined by the high and low frequency peaks.

Another object of the invention is to provide a frequency discriminator adapted to detect deviations over a wider range of frequencies than has heretofore been done, and further having a steep slope of substantial linearity between high and low frequency peaks extending over a frequency bandwidth which compares favorably with the prior art frequency discriminators.

A further object of the invention is the improvement of frequency discriminators generally.

In accordance with a general concept of the invention, there is provided a first phase shifting means constructed to produce two mutually phase-displaced output signals in response to an input signal, and a second phase shifting means constructed and arranged to be responsive to the same input signal to produce a third signal whose phase varies in response to variations in the frequency of said input signal between limits corresponding to the phases of said mutually phase-displaced signals. Means are provided for detecting the amplitude of the difference between one of said mutually phase-displaced output signals and the signal across said second phase shifting means, and further means are provided for detecting the amplitude of the difference between the other of said mutually phase-displaced output signals and the signal across said second phase shifting means. These differences will vary, one becoming larger and the other becoming smaller, as the phase of the signal across said second phase shifting means changes with changes in the frequency of the input signal. Other circuit means are provided for comparing the amplitudes of these differences to produce a D. C. signal whose amplitude varies in accordance with the variations of the frequency of the input signal.

In accordance with an important feature of the invention, the first phase shifting means is so designed that the amplitude of the mutually phase-displaced output signals will vary in different amounts for a given change in input signal frequency to produce a varying D. C. signal, independently of the phase shift of the signal across said second phase shifting means, by means of the two detecting means and the comparing circuit means mentioned hereinbefore. The two D. C. voltages appear at the same point and combine to form one resultant D. C. voltage. It is to be noted that the D. C. voltage created by the changing of amplitudes of the two mutually phase-displaced output signals is effective over a considerably wider frequency bandwidth than is the D. C. voltage created by the changing phase of the voltage signal across the second phase shifting means, thus producing a characteristic curve that has long trailers on either side of the frequency peaks.

A further feature of the invention is that the combined action of the first phase shifting means and the second phase shifting means produce a characteristic curve having a substantially linear steep slope between peak frequencies and extending over a relatively wide frequency bandwidth.

It is to be noted that the said second phase shifting means can be a tuned circuit, or, in general, any type circuit which in response to an input signal will produce a signal thereacross whose phase varies in accordance with variations in the frequency of the input signal.

These and other objects and features of the invention will be more fully understood from the following detailed description thereof when read in conjunction with the drawings in which.

Figure 1:
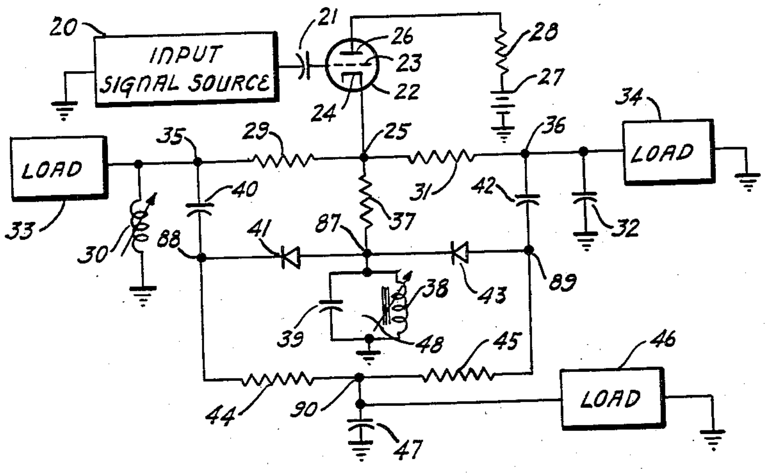
Fig. 1 is a schematic sketch of one embodiment of the invention.

Referring now to Fig. 1, the input signal source 20 is constructed to generate a signal which may vary in frequency above and below a nominal frequency herein defined as center operating frequency. Input signal source 20 is connected to the control grid 23 of the vacuum tube 22 through coupling capacitor 21. The cathode 24 of tube 22 is connected to the junction 25. The plate 26 is connected to plate battery source 27 through resistor 28. The signal impressed upon the junction 25 from the tube 22 is fed into three circuits. The first of these circuits is comprised of resistor 29 and the variable inductor 30 which function to produce a signal at point 35 leading the applied signal in phase, at center operating frequency, by an amount which, in this particular embodiment of the invention, is about 60°. The second circuit is comprised of resistor 31 and the capacitor 32 which function to produce a voltage signal at point 36 lagging the applied signal in phase, at center operating frequency, by about 60°. The lagging and leading signals at the points 35 and 36 respectively are of substantially the same amplitude. Thirdly, the signal at the junction 25 is applied through the resistance 37 to the tuned circuit 48 comprised of variable magnetic core inductor 38 and capacitor 39. The tuned circuit 48 is tuned to center operating frequency which in this embodiment of the invention is 6.7 megacycles. Capacitor 40 and diode 41 form a circuit means connecting the point 35 to the output of the tuned circuit 48 designated as point 87. Similarly, capacitor 42 and diode 43 form a circuit whereby the point 36 is connected to the tuned circuit 48. Since the capacitors 40 and 42 are relatively large, the voltage across the diodes 41 and 43 will be substantially the potential difference between points 35 and 87, and points 36 and 87 respectively. At center operating frequency the voltage at point 87 has a phase midway between the phases of the voltages at points 35 and 36 so that the voltages across the diodes 41 and 43 are equal at center operating frequency. The resistors 44 and 45 form a circuit means whereby the D. C. voltages appearing across the diodes 41 and 43 are combined to produce a resultant unilateral voltage at point 90 which is proportional to the difference between the voltages across the diodes 41 and 43 and which varies in amplitude in accordance with variations in the frequency of the signal from the input signal source 20. The capacitor 47 forms a return path for the A. C. components of the signal across the resistances 44 and 45 and further performs the function of maintaining a reasonably constant D. C. potential at point 90 for any given frequency of input signal. The loads 33 and 34 represent any suitable external loads for the output terminals of the phase shift circuitry. It is to be understood that a suitable external load must necessarily be a high impedance load since a low impedance load would appreciably lessen the amplitude of, and also the phase displacement between, the voltages existing at points 35 and 36. This would result in a smaller output signal at the point 90. The loads 33 and 34 of Fig. 5 must also be high impedances for the same reasons.

In a preferred embodiment of the invention the circuit constants may be as follows. Resistors 29, 31, 37, 44, 45 and 28 may have values of 1,000, 1,000, 10,000, 470,000, 470,000 and 330 ohms respectively. Capacitors 40, 42, 47 may have values of .01, .01 and .07 microfarad respectively and capacitors 32, 39 and 21 may have values of 20, 100 and 1,000 micromicrofarads, respectively. Variable inductors 30 and 38 may have values of from 10 to 20 microhenries and from 6 to 10 microhenries respectively. The diodes 41 and 43 may be of the 6AL5 double diode type. Other types having suitable characteristics also may be used. The battery source 27 is a positive 250 volts. Triode 22 may be of the type 12AV7. Other tubes having suitable characteristics also may be used. The frequency bandwidth over which this circuit is operable is from about 4 megacycles to about 10 megacycles, with a center frequency of 6.7 megacycles. The load circuit 46 may be any desired suitable load.

The operation of the circuit of Fig. 1 will now be described. Assume that the frequency of the signal applied to point 25 from source 20 is 6.7 megacycles at which tuned circuit 48 is resonant.

Figure 2:
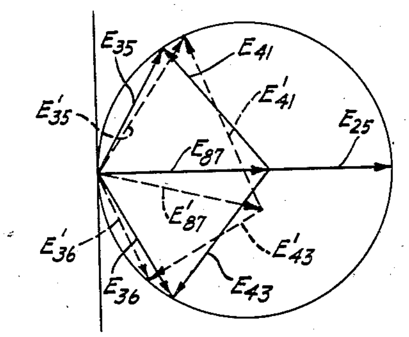
Fig. 2 is a vector diagram showing the various voltages in vector form at a frequency identified as center operating frequency which is defined hereinafter and also at a frequency above center operating frequency.

Under those conditions the vector $E_{25}$ in Fig. 2 represents the voltage at point 25 of Fig. 1 with respect to ground potential, the vector $E_{87}$ the voltage at point 87 with respect to ground potential, the vector $E_{35}$ the voltage at the point 35 with respect to ground potential, and the vector $E_{36}$ the voltage at the point 36 with respect to ground potential. As was described earlier, the voltages $E_{35}$ and $E_{36}$ respectively lead and lag the applied voltage $E_{25}$ by equal amounts at center operating frequency and further have equal amplitudes. Consequently, the resultant voltage difference between $E_{35}$ and $E_{87}$, represented by vector $E_{41}$ of Fig. 2, is the same as the resultant voltage difference between $E_{36}$ and $E_{87}$, represented by the vector $E_{43}$. Substantially all of the voltage $(E_{36}-E_{87})$ is applied across the diode 43 and, substantially all of the voltage $(E_{35}-E_{87})$ is applied across the diode 41 since the blocking capacitors 42 and 40 are large. Since the alternating currents flowing through the capacitors 40 and 42 are the same in amplitude, the D. C. potentials built up across the capacitors 40 and 42 due to the actions of the diodes 41 and 43 have the same absolute magnitudes with respect to ground potential although of different polarities. It is to be noted that D. C. potentials other than those created by the action of the diodes 41 and 43 exist across the capacitors 40 and 42. These D. C. potentials are derived from the plate supply of the tube shown in the circuit. However, these D. C. potentials do not adversely affect the operation of the circuit, inasmuch as they do not change the potential of the capacitor plates which are connected to the diodes 41 and 43. The potentials of these plates is determined by the action of the diodes 41 and 43 on the alternating voltage applied thereacross. Consequently, when the potentials existing across the capacitors 40 and 42 of Fig. 1, or the corresponding capacitors of the other circuits described herein are referred to, the reference is confined to those D. C. voltages caused by the action of the diodes 41 and 43 of Fig. 1 or the corresponding diodes of the other circuits shown herein, unless otherwise specifically stated. Returning again to Fig. 1, the D. C. potential on capacitor 40 is of a positive polarity, and the D. C. potential on capacitor 42 is of a negative polarity. Thus, a D. C. current path may be traced from point 88 through the resistors 44 and 45, point 89, and through the diodes 43 and 41 back to point 88. Since resistors 44 and 45 are equal, the D. C. potential at point 90 is midway between the potentials of points 88 and 89 which, at center operating frequency, is ground potential. This is represented as the crossover point in Fig. 4.

Assume now that the frequency of the voltage signal at point 25 increases above center operating frequency. The phase of the voltage vector $E_{87}$ in Fig. 2 will shift to a position represented by the vector $E'_{87}$, since the parallel tuned circuit 48 of Fig. 1 becomes capacitive as the frequency is increased above resonant frequency. The voltage signal at point 35 shifts to the position represented by the vector $E'_{35}$, which lags its former position $E_{35}$, since the voltage represented by the vector $E_{35}$ exists across an inductive circuit. The voltage signal at the point 36 shifts to a new phase position represented by the vector $E'_{36}$. Thus, the new voltage signals impressed across the diodes 41 and 43 are represented by the vectors $E'_{41}$ and $E'_{43}$ respectively. It can be seen from Fig. 2 that the voltage $E'_{41}$ is larger than the voltage $E'_{43}$. Consequently there will be developed across capacitor 40 a positive potential whose magnitude is greater than that of the negative potential developed across capacitor 42. The resulting D. C. current flow through the resistors 44 and 45 will create a D. C. potential at the point 90 substantially midway between the potentials of points 89 and 88, which will be positive with respect to ground and which provides an indication of the magnitude and sense of departure of the input signal frequency from nominal center frequency.

Figure 3:
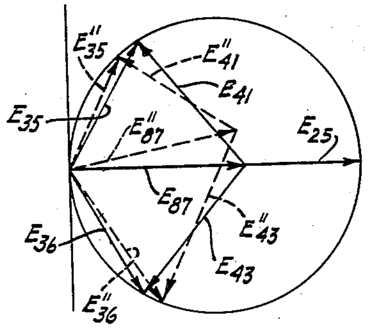
Fig. 3 is a vector diagram showing the various voltages in vector form at center operating frequency, and also at a frequency below center operating frequency.

In Fig. 3 the vectors $E_{87}$, $E_{35}$ and $E_{36}$ represent voltage signals at the points 87, 35 and 36 respectively at center operating frequency. The vectors $E''_{87}$, $E''_{35}$ and $E''_{36}$ are representative of the voltage signals at points 87, 35 and 36 respectively when the frequency of the voltage signal from source 20 in Fig. 1 decreases below the center operating frequency by a certain amount. It can be seen that under these conditions the voltage represented by the vector $E''_{87}$ leads the vector $E_{87}$ since the tuned circuit becomes inductive below resonant or center operating frequency. The voltages $E''_{41}$ and $E''_{43}$ represent the driving voltages across the diodes 41 and 43 respectively. It can be seen from an inspection of Fig. 3 that the voltage signal represented by the vector $E''_{43}$ is larger than the voltage signal represented by the vector $E''_{41}$. Thus there is a greater voltage across the diode 43 of Fig. 1 than across the diode 41, and consequently, due to the effect of diodes 43 and 41, the capacitor 42 will have a negative potential thereacross (with respect to ground) whose magnitude is greater than that of the positive potential existing across the capacitor 40. Consequently, the D. C. current flowing through the equal valued resistors 44 and 45, and the diodes 43 and 41, will produce a negative D. C. potential at the terminal 90 which is indicative of the magnitude and sense of departure of the input signal frequency from the center frequency.

Figure 4:
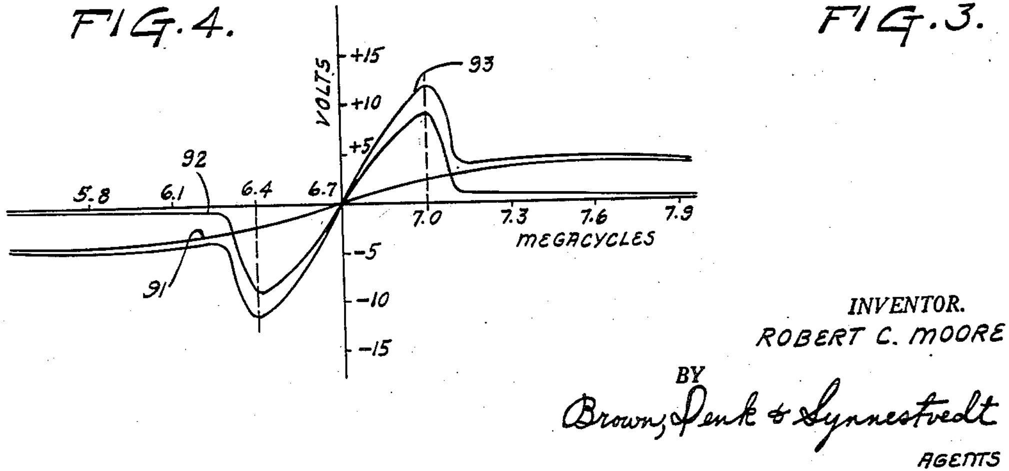
Fig. 4 shows the characteristic curve of the circuit of Fig. 1.

It is to be noted that, with the use of the parallel resonant circuit 48, the discriminator characteristic of the phase shift circuitry and the discriminator characteristic of the tuned circuit aid each other to produce the characteristic curve 93 shown in Fig. 4. The curve 91 represents the discriminator characteristic curve due to the phase shift circuitry alone. The curve 92 represents the discriminator characteristic curve due to the parallel resonant circuit 48 alone. The curve 93 represents the characteristic curve of the overall circuit. Because of the parallel tuned circuit, which preferably is a high Q circuit, and further because of the addition of the characteristic represented by the two curves 91 and 92, the slope of the curve 93 at crossover can be made somewhat steeper than for conventional type frequency discriminators, while maintaining a peak-to-peak bandwidth comparable to that of the prior art devices, thus providing stronger signals when deviation occurs, and thereby providing more accurate control. Further, it will be observed that the curve 93 has skirts thereon which extend well beyond both sides of the peak-to-peak bandwidth utilized during normal operation. The circuit has been found to be very effective throughout a bandwidth extending from 4 megacycles to 13 megacycles. On the lower side of the operating frequency the skirt potential is negative, and on the upper side of the center operating frequency the skirt potential is positive. Thus, if the circuit is energized from a de-energized condition and the initial frequency of the input signal is far enough removed from center operating frequency to be outside the frequency peaks, the polarity of potential of the signal will indicate whether the frequency should be increased or decreased.

Figure 5:
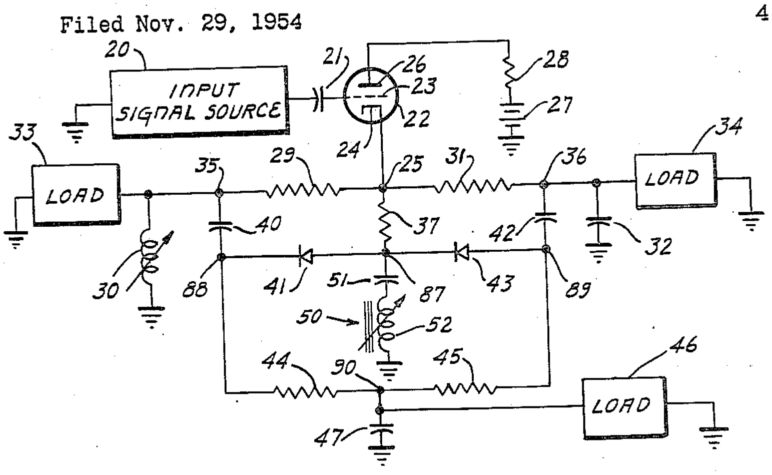
Fig. 5 is a schematic sketch of another species of the invention.

Referring now to Fig. 5, the circuit is the same as that of Fig. 1 except that a series tuned circuit 50 is utilized instead of the parallel tuned circuit 48 of Fig. 1. All other elements of the circuit are the same as the corresponding elements of Fig. 1 and are identified by the same reference characters. However, the series tuned circuit will produce a different operation than the parallel tuned circuit as will be discussed in detail later herein. The values of the circuit elements of Fig. 5 in a typical embodiment shown therein can be the same as those of the corresponding circuit elements of Fig. 1. Capacitor 51 has a value of 25 micromicrofarads, and variable magnetic core inductor 52 has a value of 20–40 microhenries.

Figure 7:
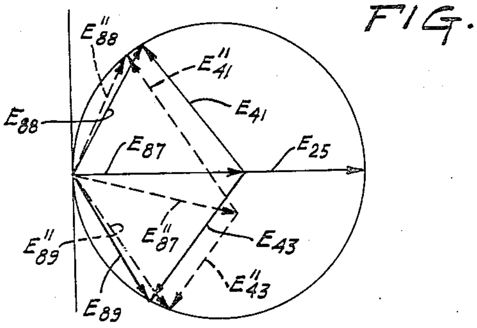
Fig. 7 is a vector diagram of voltages at various points of the circuit of Fig. 5 at center operating frequency and also at a frequency below center operating frequency.
Figure 6:
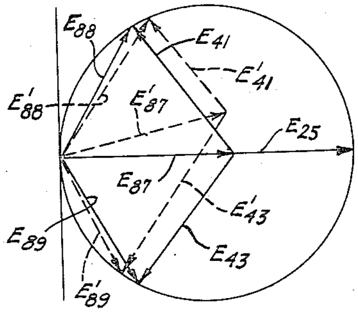
Fig. 6 is a vector diagram of voltages at various points of the circuit of Fig. 5 at center operating frequency and also at a frequency above center operating frequency.
Figure 8:
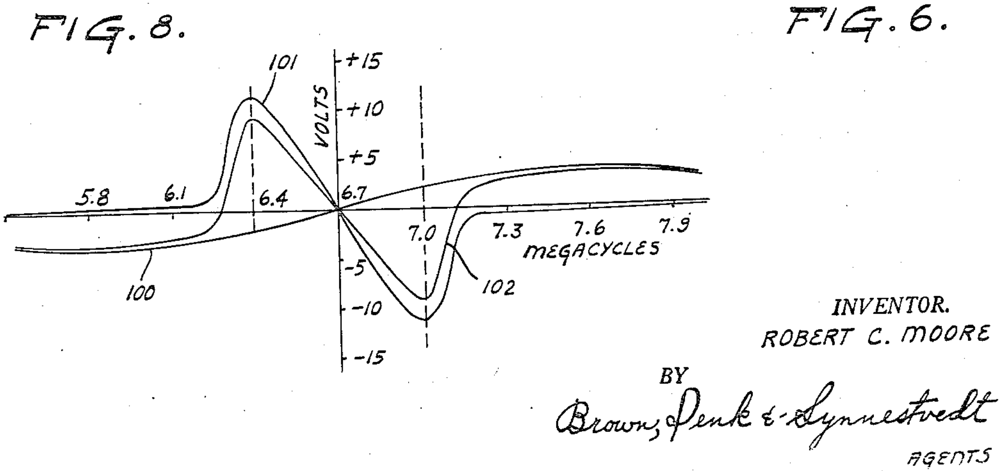
Fig. 8 shows the characteristic curve of the circuit of Fig. 5.

The operation of the circuit of Fig. 5 is similar to that of Fig. 1, except that the discriminator characteristic curve 100 (Fig. 8), due to the phase shift circuitry, does not aid the discriminator characteristic curve 101 (Fig. 8) due to the series tuned circuit 50. This is because the series tuned circuit becomes inductive when the frequency increases above the center operating frequency. This is shown in Fig. 6, wherein the vectors $E_{87}$, $E_{88}$ and $E_{89}$ represent the amplitudes and phase relationships of the voltage signals at points 87, 88 and 89 respectively of the circuit of Fig. 5 at center operating frequency. When the frequency of the input signal increases above center operating frequency, the voltage signals at points 87, 88 and 89 will assume the phase relationships represented respectively by vectors $E'_{87}$, $E'_{88}$ and $E'_{89}$ in Fig. 6. It is to be noted that the vector $E'_{88}$ is of greater magnitude than the vector $E'_{89}$. Thus, in the absence of the series resonant circuit 50 of Fig. 1, and assuming point 87 to be grounded, the positive D. C. potential at point 88 will have an absolute value with respect to ground larger than that of the negative D. C. potential at point 89. This will produce a positive D. C. potential at terminal 90. The presence of the series-tuned circuit 50, however, produces the voltage $E'_{87}$ at point 87, which creates a voltage $E'_{41}$ across the diode 41, and a voltage $E'_{43}$ across the diode 43. Since the voltage $E'_{43}$ is greater than the voltage $E'_{41}$, the absolute value of the negative D. C. potential with respect to ground created at point 89 will be greater than that of the positive D. C. potential created at point 88, and a resultant negative D. C. potential will be established at the point 90. A similar phenomenon occurs when the frequency decreases below the center operating frequency. This is shown in Fig. 7 wherein vectors $E_{87}$, $E_{88}$ and $E_{89}$ represent the voltages at points 87, 88 and 89 at center operating frequency, and wherein vectors $E''_{87}$, $E''_{88}$ and $E''_{89}$ represent voltages at points 87, 88 and 89 at a frequency below center operating frequency. Thus, the circuit of Fig. 5 can be seen to have a discriminator characteristic curve having three crossover points, a reasonably steep slope in the center operating frequency range, and skirts of relatively large amplitude. Curve 102 of Fig. 8 shows the overall discriminator characteristic curve of the circuit of Fig. 5.

Figure 9:
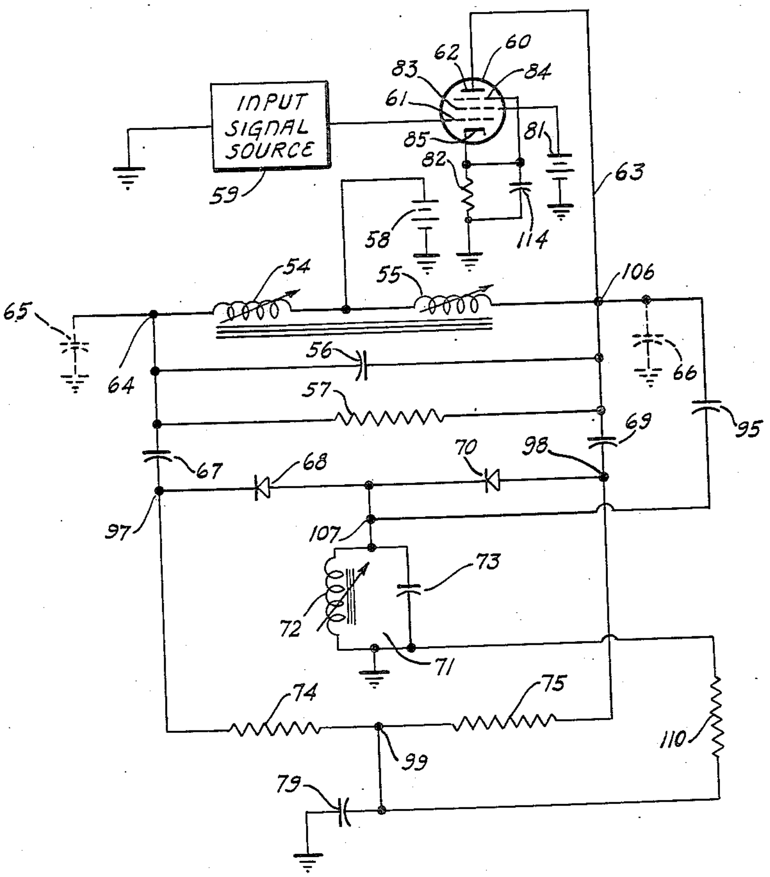
Fig. 9 is a schematic sketch of the third species of the invention.

Referring now to Fig. 9, the phase shift circuitry comprises tunable, loosely coupled magnetic core inductors 54 and 55 having a junction therebetween which is connected to the battery source 58, the capacitor 56 which is connected across the two inductors 54 and 55, the resistor 57 which also is connected across the inductors 54 and 55, and stray capacitances to ground 65 and 66 of the inductors 54 and 55, which together form a loosely coupled double tuned circuit. The primary portion of the double tuned circuit, including winding 55, capacitor 56, and stray capactance 66, is tuned to a frequency above center operating frequency so that at center operating frequency the circuit is inductive in nature. Similarly, the tuned circuit 71, comprised of capacitor 73 and variable magnetic core inductor 72, is tuned to a frequency above center operating frequency so that at center operating frequency the circuit is inductive in nature. The capacitor 95, however, supplies capacitive reactance to both the primary portion of the double tuned circuit and also to the tuned circuit 71 so that the overall impedance to the constant current input source represented by the pentode 60 is resistive in nature at center operating frequency. This will be understood more fully from the description of the operation thereof set forth hereinafter. The input signal source 59 is connected to the control grid 61 of the pentode 60. The plate 62 of the pentode 60 is connected directly to the primary portion of the phase shift circuit, and is connected to the tuned circuit 71 through the capacitor 95. Battery 81 forms a biasing means for screen grid 83. Suppressor grid 84 is connected to the cathode 85, which in turn is connected to ground through the parallel combination of resistor 82 and capacitor 114.

The circuit constants are so selected that, at center operating frequency, the voltage signal at point 64 is about 180° out of phase with the voltage signal at the point 106. As will be seen more clearly later herein, the voltage at point 107 at center operating frequency leads the voltage at point 106 by 90°. Capacitor 67 and diode 68 form a circuit connecting the point 64 to the common terminal 107 of tuned circuit 71.

The difference between the voltage signal at point 64 and that at point 107 will cause the blocking capacitor 67 to acquire a positive charge due to the asymmetrical nature of the diode 68. Capacitor 69 and the diode 70 form a circuit connecting the point 106 to the common terminal 107 of the tuned circuit 71. The difference in potential between the voltage signal at point 106 and that at point 107 will cause the blocking capacitor 69 to acquire a negative charge due to the asymmetrical nature of the diode 70.

At center operating frequency the values of D. C. potentials created across the capacitors 67 and 69 due to the action of the diodes 68 and 70 will be equal although of different polarity. Consequently, the two equal resistors 74 and 75, which are connected across the diodes 68 and 70, will divide the voltage on the capacitors equally so that point 99 will be at ground potential. If the D. C. charges on the capacitors 67 and 69 are unequal as a result of a frequency deviation from center operating frequency, the potential of the point 99 will be intermediate the D. C. potentials on capacitors 67 and 69. However, by reason of the current drawn by the output load 110, which is a high resistance compared to the resistors 74 or 75, the potential of point 99 will not be exactly midway between the potentials of capacitors 67 and 69.

The capacitor 79 performs the function of removing the A. C. components from the potential at point 99. Since the capacitor 79 discharge time is relatively long compared to the period of the input signal, a substantially constant D. C. voltage will exist at the point 99 when there are unbalanced voltages across the diodes 68 and 70. The polarity and magnitude of this D. C. voltage are representative respectively of the sense and magnitude of deviation of the frequency of the input signal from center operating frequency (within a certain bandwidth).

A typical set of circuit constants for this embodiment of the invention is as follows: Resistors 57, 74, 75, 110 and 82 have values of 10,000, 47,000, 47,000, 220,000 and 180 ohms respectively; variable inductors 54 and 55 each have values of from 25 to 50 microhenries; variable inductor 72 has a value of from 6 to 10 microhenries; and capacitors 65, 66, 67, 69, 56, 73, 79 and 114 have values of 3, 7, 2000, 2000, 5, 68, 2000, and 10,000 micromicrofarads respectively. Batteries 81 and 58 are each 120 volt sources. Diodes 68 and 70 may be the same as the diodes 41 and 43 of Fig. 1. Pentode 60 may be of the type 6CB6.

The operation of the circuit of Fig. 9 now will be described in detail. Assume the pentode 60 to be a constant current source and that the total plate current thereof is represented by the vector $I_p$ of Fig. 10. At center operating frequency the plate current $I_p$ sees a resistive load since the components of the circuit have been chosen so that, at this frequency, their net reactance is zero. Therefore, the potential at junction 106 of Fig. 9 is in phase with the plate current $I_p$.

The primary portion of the double tuned circuit, which includes winding 55, capacitor 56 and stray capacitance 66, is not tuned to resonance at center operating frequency.

Figure 10:
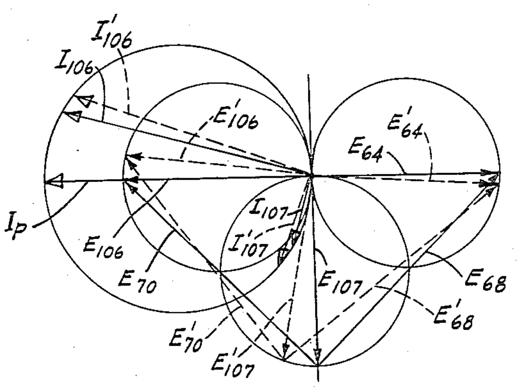
Fig. 10 is a vector diagram showing the voltages at various points of the circuit of Fig. 9 at center operating frequency and also at a frequency above center operating frequency.

Similarly, the parallel tuned circuit 71, including inductor 72 and capacitor 73, is not tuned to center operating frequency. However, both the primary portion of the double tuned circuit and the tuned circuit 71, in conjunction with the capacitor 69, form a circuit which presents a non-reactive impedance to the plate current $I_p$. As can be seen from Fig. 9, the current $I_p$ divides at point 106 and a first portion flows to the primary of the double tuned circuit and a second portion flows into the tuned circuit 71. The current flow into the primary portion of the double tuned circuit, which is represented by the vector $I_{106}$ of Fig. 10, is inductive in nature at center operating frequency and lags the voltage $E_{106}$. Since the total current flow must equal $I_p$, the current flow into the point 107 is a quantity represented by the vector $I_{107}$. Further, since at center operating frequency the circuit 71 is inductive in nature, the voltage thereacross will lead the current and is represented by the vector $E_{107}$ which, it will be noted, leads the voltage at point 106 of Fig. 9 by 90°. The voltage at point 64 is represented by vector $E_{64}$ and is about 180° out of phase with the voltage at point 106 of Fig. 9.

Figure 13:
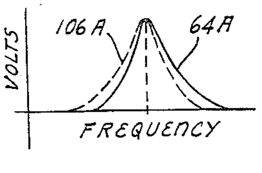
Fig. 13 shows the frequency response curves of certain portions of the circuit of Fig. 9.

Vectors $E_{68}$ and $E_{70}$ represent the voltages across the diodes 68 and 70 respectively. It can be seen that these voltages are of equal amplitude and, consequently, the potentials existing across the blocking capacitors 67 and 69 due to the action of the diodes 68 and 70 will be equal in magnitude and opposite in polarity. Since resistances 74 and 75 are equal, point 99 will be at ground potential. If the frequency of the input signal increases above center operating frequency, the overall impedance presented to the input current $I_p$ becomes capacitive so as to lead the voltage at point 106. This new voltage is represented by the vector $E'_{106}$. Further, due to the increase in frequency, the primary portion of the double-tuned circuit becomes less inductive so that the new current therethrough, represented by the vector $I'_{106}$, does not lag the voltage $E'_{106}$ as much as at center operating frequency. The new current vector $I'_{107}$ is determined by the current vector $I'_{106}$ and, as can be seen from Fig. 10, is rotated in a clockwise direction. The voltage at point 107 also rotates in a clockwise direction since the tuned circuit 71 becomes less inductive with the increased frequency, so that the phase angle between the current $I'_{107}$ and $E'_{107}$ decreases. The voltage at point 64 of Fig. 9 changes phase but not as much as the voltage at point 106, due largely to the difference in values of the capacitors 65 and 66 which produce different shaped frequency response curves, as can be seen from Fig. 13, wherein curve 106A represents the response at point 106 and curve 64A represents the response at point 64. The difference between voltages $E'_{106}$ and $E'_{107}$ represented by the vector $E'_{70}$ of Fig. 10, is the voltage across the diode 70, and the difference between voltage $E'_{64}$ and $E'_{107}$, represented by the vector $E'_{68}$, is the voltage across the diode 68 of Fig. 9. It can be seen that the voltage $E'_{68}$ is larger than the voltage $E'_{70}$. Consequently, due to the effect of the diodes 68 and 70, there will exist across the capacitor 67 a positive potential having an absolute value larger than the absolute value of the negative potential existing across the capacitor 69. This will result in a positive D.-C. potential at the junction 99, since resistors 74 and 75 are equal. As in the previously described embodiments of the invention, this potential is indicative of the magnitude and sense of the departure of the frequency of the input signal.

Figure 11:
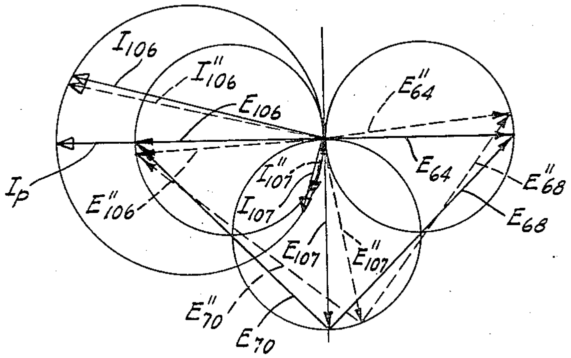
Fig. 11 is a vector diagram showing the voltages at various points of the circuit of Fig. 9 at center operating frequency and also at a frequency below center operating frequency.

If the frequency of the input signal from source 59 decreases below center operating frequency, the voltages at various points in the circuit will vary in accordance with the vector diagram of Fig. 11, wherein vectors $E_{106}$, $E_{107}$ and $E_{64}$ represent the voltages at points 106, 107 and 64 respectively of Fig. 9 at center operating frequency, and wherein the vectors $E''_{106}$, $E''_{107}$ and $E''_{64}$ represent the voltages at points 106, 107 and 64 respectively of Fig. 9 at a frequency below center operating frequency. Vector $I_{106}$ represents the current flow from point 106 into the primary portion of the double-tuned circuit, and vector $I_{107}$ represents the current flow into the point 107. When the frequency decreases below center operating frequency, the circuit becomes inductive so that the input current $I_p$ lags the voltage at point 106 which is represented by the vector $E''_{106}$. The current flowing into the primary portion of the double-tuned circuit from the terminal 106 increases its lagging phase angle with the voltage $E''_{106}$ and is represented by the vector $I''_{106}$. The new current flow into point 107 of Fig. 9 is represented by the vector $I''_{107}$, which leads the center operating current flow $I_{107}$. The phase angle between the current $I''_{107}$ and $E''_{107}$ is increased because of the increased inductiveness of the circuit. The voltage $E''_{64}$ leads the voltage $E_{64}$. The resultant voltages $E''_{70}$ and $E''_{68}$, that exist across the diodes 70 and 68 respectively of Fig. 9, can be seen to have unequal values with $E''_{70}$ having the greater value. Consequently, the voltage across diode 70 of Fig. 9 will be greater than the voltage across the diode 68. Thus the absolute value of the negative D. C. voltage on the blocking capacitor 69 will be greater than the absolute value of the positive D. C. voltage on the capacitor 67, so that the terminal 99 will have a negative voltage thereon.

Figure 12:
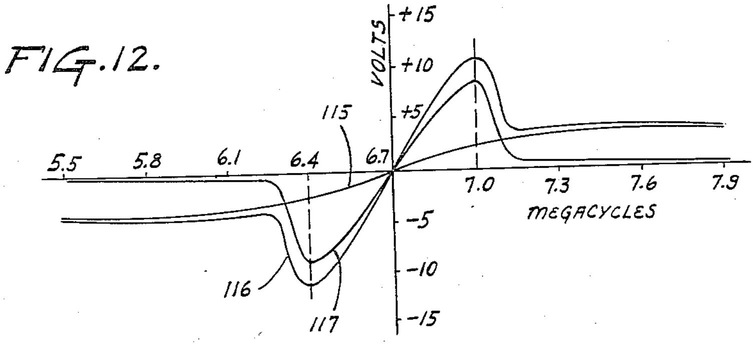
Fig. 12 shows the characteristic curve of the circuit of Fig. 9.

It is to be noted that when the frequency decreases below center operating frequency, the voltage at point 64 of Fig. 9 decreases at a faster rate than does the voltage of point 106. This characteristic produces a negative polarity trailing edge on the characteristic curve of the circuit of Fig. 9 as can be seen from Fig. 12, wherein the curve 115 represents the D. C. voltage that is present on the terminal 99 in Fig. 9, due to the change in amplitudes of the voltage vectors $E_{64}$ and $E_{106}$, wherein the curve 117 represents the D. C. voltage that would be present on the terminal 99 due to the rotation of the vector $E_{107}$, and wherein the curve 116 represents the overall characteristic of the circuit. Similarly, a positive trailing edge is produced when the frequency increases above center operating frequency. This is due to the fact that the voltage vector $E_{106}$ rotates more in a clockwise direction than does the voltage vector $E_{64}$, as can be seen from Fig. 10, to produce a difference in amplitudes. The above mentioned characteristics can be more readily understood from the frequency response curves of Fig. 13 wherein it can be seen that for a given change of frequency the amplitudes of the voltages at points 64 and 106 will vary in different amounts.

It is to be noted that the preferred embodiments of the invention described in detail herein show either a parallel tuned circuit or a series tuned circuit which, in response to an applied input signal, will produce a signal thereacross whose phase will vary in accordance with variations of the frequency of the input signal. Other forms of phase shifting circuits also will perform this function in a satisfactory manner. Consequently, the invention is not to be limited to the use of tuned circuits. Further, various other change may be made in circuit constants and circuit arrangements without departing from the spirit or scope of the invention.

I claim:

1. In a frequency discriminator circuit, a first phase shifting means responsive to an input signal to produce mutually phase-displaced output signals whose phases vary in accordance with variations in frequency of said input signal, a second phase shifting means constructed to be responsive to said signal applied thereto to produce a third signal across said second phase shifting means whose phase varies in accordance with variations in the frequency of said input signal, means for applying said signal to said first phase shifting means and to said second phase shifting means, means for deriving a signal equal to the difference between one of the output signals from said first phase shifting means and the signal produced across said second phase shifting means, means for deriving another signal equal to the difference between the other output signal from said first phase shifting means and the signal produced across said second phase shifting means, means for separately detecting the amplitudes of said derived signals, and means for combining said detected signals to produce a D. C. signal whose amplitude varies in accordance with variations in the frequency of said input signal.

2. In a frequency discriminator circuit, a first phase shifting means responsive to an input signal to produce mutually phase-displaced output signals whose amplitudes vary in different amounts with any given deviation of frequency of said input signal, a second phase shifting means constructed to be responsive to said signal applied thereto to produce a third signal across said second phase shifting means whose phase varies in accordance with variations in the frequency of said input signal, means for applying said signal to said first phase shifting means and to said second phase shifting means, means for deriving a signal equal to the difference between one of the output signals of said first phase shifting means and the signal produced across said second phase shifting means, means for deriving another signal equal to the difference between the other output signal of said first phase shifting means and the signal produced across said second phase shifting means, means for separately detecting the amplitudes of said derived signals, and means for combining said detected signals to produce a D. C. signal whose amplitude varies in accordance with variations in the frequency of said input signal.

3. In a frequency discriminator circuit, a phase shifting network responsive to an input signal to produce mutually phase-displaced output signals whose phases vary in accordance with variations in frequency of said input signal, a tuned circuit, means for applying said signal to said phase shifting network and to said tuned circuit to produce across said tuned circuit a third signal corresponding to said input signal but whose phase varies in accordance with variations in the frequency of said input signal, means for deriving a signal equal to the difference between one of the output signals from said phase shifting network and the signal produced across said tuned circuit, means for deriving a second signal equal to the difference between the other output signal from said phase shifting network and the signal produced across said tuned circuit, means for separately detecting the amplitudes of said derived signals, and means for combining said detected signals to produce a unidirectional signal whose amplitude varies in accordance with variations in the frequency of said input signal.

4. In a frequency discriminator circuit, a phase shifting network responsive to an input signal to produce mutually phase-displaced output signals whose amplitudes vary in different amounts with any given deviation of frequency of said input signal, a tuned circuit, means for applying said signal to said phase shifting network and to said tuned circuit to produce across said tuned circuit a signal corresponding to said input signal but whose phase varies in accordance with variations in the frequency of said input signal, means for deriving a first signal equal to the difference between one of the output signals from said phase shifting network and the signal produced across said tuned circuit, means for deriving a second signal equal to the difference between the other output signal from said phase shifting network and the signal produced across said tuned circuit, means for separately detecting the amplitudes of said derived signals, and means for combining said detected signals to produce a D. C. signal whose amplitude varies in accordance with variations in the frequency of said input signal.

5. In a frequency discriminator, means including a tuned circuit responsive to an input signal to produce across said tuned circuit a signal whose phase varies in response to variations in the frequency of input signal, a phase shifting network comprising a first output means and a second output means and arranged to be responsive to said input signal to produce at said first and second output means mutually phase-displaced signals whose phases vary in accordance with variations in frequency of said input signal and which respectively lead and lag by substantially equal amounts the signal produced across said tuned circuit when the frequency of said input signal is substantially equal to the resonant frequency of said tuned circuit, means for applying said input signal to said first-named means and to said phase shifting network, means comprising a first detector means connecting said first output means to the said tuned circuit, means comprising a second detector means connecting said second output means to said tuned circuit, and circuit means connected across said first and second detector means, said circuit means being constructed and arranged to combine the signals appearing across said first and second detector means to produce a D. C. signal whose amplitude varies in accordance with changes in frequency of the said input signal.

6. A frequency discriminator in accordance with claim 5 in which said first detector means comprises a first diode and a first capacitor means and in which said second detector means comprises a second diode and a second capacitor means, the anode of said first diode being connected to the cathode of said second diode.

7. A frequency discriminator in accordance with claim 5 in which said tuned circuit comprises a parallel tuned circuit.

8. A frequency discriminator in accordance with claim 5 in which said tuned circuit comprises a series tuned circuit.

9. In a frequency variation detecting circuit, a first phase shifting means constructed to be responsive to an applied input signal to produce a first signal thereacross whose phase varies in accordance with variations in the frequency of the applied input signal, a second phase shifting means having a first output means and a second output means, said second phase shifting means being constructed when energized by said input signal to produce a second signal at said first output means which leads the signal across said first phase shifting means and to produce a third signal at said second output means which lags the signal across said first phase shifting means, the second phase shifting means being further constructed to cause the amplitude of said second signal to become less with respect to the amplitude of said third signal when the frequency of the input signal decreases and to cause the amplitude of said third signal to become less with respect to the amplitude of said second signal when the frequency of the input signal increases, means for applying said input signal to said first phase shifting means and said second phase shifting means, means designed to detect the amplitude of the difference between the signal at said first output means and the signal across said first phase shifting means, means designed to detect the amplitude of the difference between the signal at said second output means and the signal across said first phase shifting means, and means constructed to combine the detected signals to produce a D. C. signal whose amplitude varies in accordance with variations in the frequency of the input signal.

10. In a frequency discriminator circuit, a first phase shifting means having a first terminal and constructed to be responsive to an input signal applied thereto to produce a signal thereacross corresponding to the said input signal but whose phase varies in accordance with variations in the frequency of the input signal, a second phase shifting circuit comprising a series combination of a first resistor and an inductor having a first junction therebetween and arranged to be energized by the input signal, said second phase shifting circuit further comprising a series combination of a second resistor and a first capacitor having a second junction therebetween and arranged to be energized by the input signal, means for applying said input signal to the said first phase shifting means and the second phase shifting circuit, a series combination of a second capacitor and a first diode connected between said first junction and said first terminal of the said first phase shifting means, a series combination of a third capacitor and a second diode connected between said second junction and said first terminal of the said first phase shifting means, the anode of said first diode being connected to the cathode of said second diode, and means constructed to combine the signals appearing across said first and second diodes to produce a unilateral signal whose amplitude varies in accordance with variations of the frequency of the said input signal.

11. A frequency discriminator circuit comprising first and second terminal means for applying an input signal thereto, a capacitive circuit means having a first output means and being connected between the first and second terminal means, an inductive circuit means having a second output means and being connected between the first and second terminal means, a third circuit means comprising a tuned circuit connected between the said first and second terminal means, said tuned circuit having an output terminal, a first capacitor and first diode connected in series arrangement between said first output means and the output terminal of said tuned circuit, a second capacitor and a second diode connected in series arrangement between said second output means and the output terminal of said tuned circuit, the anode of one of said diodes being connected to the cathode of the other of said diodes, and resistive means connected across said first and second diodes and having an output tap therein, the said resistive means being designed to combine signals appearing across the first and second diodes and to produce at the tap thereof a unilateral signal whose amplitude varies in accordance with variations in the frequency of the said input signal.

12. A frequency discriminator circuit in accordance with claim 11 in which said tuned circuit comprises a parallel tuned circuit.

13. A frequency discriminator circuit in accordance with claim 11 in which said tuned circuit comprises a series tuned circuit.

References Cited in the file of this patent

UNITED STATES PATENTS

| | | |
|---|---|---|
| 2,243,417 | Crosby | May 27, 1941 |
| 2,312,070 | Bliss | Feb. 23, 1943 |
| 2,397,841 | Crosby | Apr. 2, 1946 |
| 2,422,513 | Yeandle | June 17, 1947 |
| 2,498,253 | Curtis | Feb. 21, 1950 |